(12) United States Patent
Zemach et al.

(10) Patent No.: US 12,476,916 B2
(45) Date of Patent: Nov. 18, 2025

(54) NOTIFICATION-BASED LOAD BALANCING IN A NETWORK

(71) Applicant: Marvell Israel (M.I.S.L) Ltd., Yokneam (IL)

(72) Inventors: Rami Zemach, Givat Shapira (IL); Avin Faldu, Rajkot (IN); Adar Peery, Aseret (IL); David Melman, Halutz (IL); Itay Peled, Hagor (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 150 days.

(21) Appl. No.: 18/112,978

(22) Filed: Feb. 22, 2023

(65) Prior Publication Data

US 2023/0269184 A1  Aug. 24, 2023

Related U.S. Application Data

(60) Provisional application No. 63/312,832, filed on Feb. 22, 2022.

(51) Int. Cl.
  *H04L 47/125* (2022.01)
  *H04L 45/00* (2022.01)
  (Continued)

(52) U.S. Cl.
  CPC ............ *H04L 47/125* (2013.01); *H04L 45/22* (2013.01); *H04L 47/11* (2013.01); *H04L 47/12* (2013.01)

(58) Field of Classification Search
  CPC ....... H04L 47/125; H04L 47/11; H04L 47/28; H04L 47/12; H04L 45/22; H04L 45/02; H04L 45/7453; H04L 45/04; H04L 49/15
  See application file for complete search history.

(56) References Cited

U.S. PATENT DOCUMENTS 9,363,181 B1  6/2016  Nachum
9,503,435 B2  11/2016  Roitshtein et al.
(Continued)

FOREIGN PATENT DOCUMENTS

CN  109154896 A  *  1/2019  ........... G06F 9/5083
CN  115914078 A  *  4/2023  ......... H04L 12/1886
(Continued)

OTHER PUBLICATIONS

Zhang et al., "Hashing Linearity Enables Relative Path Control in Data Centers," 2021 USENIX Annual Technical Conference, https://www.usenix.org/conference/atc21/presentation/zhang-zhehui, Jul. 14-16, 2021. (Year: 2021).*

(Continued)

*Primary Examiner* — Alina A Boutah

(57) ABSTRACT

In a network switching system that comprises a plurality of interconnected network devices, a first network device transmits one or more first packets via a first network interface of the first network device, the one or more first packets belonging to a packet flow. The first network device receives a message that indicates congestion corresponding to the packet flow within the network switching system. In response to the message, the first network device selects a second network interface of the first network device for transmitting one or more second packets that belong to the packet flow. After receiving the message, the first network device transmits the one or more second packets via the second network interface of the first network device.

20 Claims, 7 Drawing Sheets

(51) Int. Cl.
*H04L 45/7453* (2022.01)
*H04L 47/11* (2022.01)
*H04L 47/12* (2022.01)
*H04L 49/15* (2022.01)

(56) References Cited

U.S. PATENT DOCUMENTS

| | | | |
|---|---|---|---|
| 9,680,951 B1* | 6/2017 | Graham-Cumming | H04L 45/566 |
| 9,853,900 B1* | 12/2017 | Mula | H04L 45/24 |
| 9,876,719 B2 | 1/2018 | Revah et al. | |
| 10,812,391 B1* | 10/2020 | Shmilovici Leib | H04L 47/125 |
| 10,904,150 B1 | 1/2021 | Kampeas et al. | |
| 11,303,606 B1* | 4/2022 | Chew | H04L 45/7453 |
| 2006/0206706 A1* | 9/2006 | Dietz | H04L 45/00 713/154 |
| 2012/0136999 A1* | 5/2012 | Roitshtein | H04L 9/0643 709/225 |
| 2013/0107712 A1* | 5/2013 | Allan | H04L 47/125 370/235 |
| 2016/0316005 A1* | 10/2016 | Thirumurthi | H04L 67/1023 |
| 2019/0052567 A1* | 2/2019 | Muntz | H04L 69/16 |
| 2019/0104057 A1* | 4/2019 | Goel | H04L 45/24 |
| 2019/0190833 A1* | 6/2019 | Georgios | H04L 47/125 |
| 2019/0319882 A1* | 10/2019 | Yuan | H04L 47/28 |
| 2020/0169513 A1* | 5/2020 | Goel | H04L 69/40 |
| 2020/0177495 A1* | 6/2020 | Inoue | H04L 45/70 |
| 2021/0297351 A1* | 9/2021 | Vegesna | H04L 49/90 |
| 2023/0079715 A1* | 3/2023 | Seely | H04L 47/12 370/235 |

FOREIGN PATENT DOCUMENTS

| | | | | |
|---|---|---|---|---|
| EP | 3716543 A1 * | 9/2020 | | G05B 19/0423 |
| JP | 5860670 B2 * | 2/2016 | | H04L 45/00 |
| WO | WO-2012112834 A2 * | 8/2012 | | H04L 45/24 |
| WO | WO-2019026684 A1 * | 2/2019 | | H04L 45/08 |

OTHER PUBLICATIONS

Lim et al., "Load Balancing Algorithm with Programmable Switch," Department of Computer Science and Engineering, POSTECH, Pohang, Korea, IEEE Xplore. (Year: 2020).*

Aghdai et al., "In-network Congestion-aware Load Balancing at Transport Layer," 2019 IEEE Conference on Network Function Virtualization and Software Defined Networks (NFV-SDN) (Year: 2019).*

International Search Report and Written Opinion for PCT Application No. PCT/IB2023/051645 mailed May 4, 2023 (14 pages).

* cited by examiner

NOTIFICATION-BASED LOAD BALANCING IN A NETWORK

CROSS REFERENCES TO RELATED APPLICATIONS

This application claims the benefit of U.S. Provisional Patent Application No. 63/312,832, entitled "Notification Based Balancing," filed on Feb. 22, 2022, which is hereby incorporated herein by reference in its entirety.

FIELD OF TECHNOLOGY

The present disclosure relates generally to network communication systems, and more particularly to load balancing within a network communication system.

BACKGROUND

Some networking applications require switching between a very large number of ports. For example, a typical data center includes a large number of servers, and switches to interconnect the servers and to communicatively couple the servers to outside network connections, such as backbone network links. In such applications, switching systems capable of switching between numerous ports are utilized so that traffic can be forwarded between backbone network lines and a large number of servers and/or between each server and a large number of other servers. Such switching systems can include a large number of switches, and each switch typically is capable of switching between several ports. In data centers and server farms, multiple layers of switches are often utilized to enable forwarding packets between each server and a backbone network link and/or between each server and a large number of other servers. For example, a first layer of switches provides ports to which servers and network links are connected, and a second layer of switches interconnects the first layer of switches. In some networks, a third layer of switches interconnects the second layer of switches. In some networks, a switching system comprises four or more layers of switches. In such switching systems it is important to balance traffic load among multiple links that are available between switches among the different layers.

SUMMARY

In an embodiment, a first network switching device is for use in a network switching system that comprises a plurality of interconnected network switching devices. The first network switching device comprises: a plurality of first network interfaces configured to communicatively couple to a plurality of network uplinks that are communicatively coupled to multiple other network switching devices in the network switching system; a plurality of second network interfaces configured to communicatively couple to a plurality of network downlinks that are communicatively coupled to one or more network devices external to the network switching system; a packet processor configured to process packets received by the plurality of first network interfaces and the plurality of second network interfaces and to forward packets to the plurality of first network interfaces and the plurality of second network interfaces for transmission. The packet processor includes circuitry configured to: forward first packets belonging to a packet flow to one of the first network interfaces for transmission within the network switching system; receive a message that indicates congestion corresponding to the packet flow within the network switching system; in response to the message, select another first network interface for forwarding one or more second packets that belong to the packet flow; and after receiving the message, forwarding the one or more second packets to the other first network interface.

In another embodiment, a method is for load balancing in a network switching system that comprises a plurality of interconnected network devices. The method includes: transmitting, by a first network device among the plurality of interconnected network devices, one or more first packets via a first network interface of the first network device, the one or more first packets belonging to a packet flow; receiving, at the first network device, a message that indicates congestion corresponding to the packet flow within the network switching system; in response to the message, selecting, at the first network device, a second network interface of the first network device for transmitting one or more second packets that belong to the packet flow; and after receiving the message, transmitting, by the first network device, the one or more second packets via the second network interface of the first network device.

BRIEF DESCRIPTION OF THE DRAWINGS

FIG. 4 is a flow diagram of an example method for controlling the paths by which packets are forwarded through a network switching system such as the network switching system of FIG. 1, by altering fields in headers of the packets, according to an embodiment.

DETAILED DESCRIPTION

Some conventional load balancing techniques involve periodically calculating utilization of all communication links in a switching system and communicating the calculated utilization information to all network devices in the switching system. Based on the calculated utilization information, optimal paths through the switching system are calculated. The optimal paths are calculated periodically, and frequent load rebalancing is performed to account for changes in network loads over time.

Such conventional load balancing techniques are computationally intensive, and thus load balancing response times in connection with network traffic changes are often slow. Additionally, because each network device receives and uses link utilization information from across the entire network switching system, scaling such load balancing approaches is challenging as the number of network devices in a switching system increases. Further, such load balancing techniques result in frequent load rebalancing, which raises issues with packet reordering.

In embodiments described below, a network switching system comprises a plurality of interconnected network devices (e.g., switches, routers, etc.), with multiple alternative paths between pairs of network devices. Each of at least some of the network devices is configured to, in response to detecting congestion at the network device corresponding to a packet flow, transmit a congestion notification message to a source of the packet flow in the network switching system. Additionally, each of at least some of the network devices is configured to, in response to receiving a congestion notification message corresponding to a packet flow, select a new path within the network switching system for transmitting packets belonging to the flow.

Embodiments of load balancing methodologies are described herein in the context of load balancing traffic in a hierarchical topology of switching or routing devices as often found in a data center, for example. It is noted however, in light of the disclosure and teachings herein, that similar methods and apparatus for load balancing can be employed in other suitable systems in which multiple links or paths are available for forwarding traffic in a network. The described load balancing methodologies are not limited to use in hierarchical data center topologies, but rather may be utilized in other suitable contexts as well.

Figure 1:
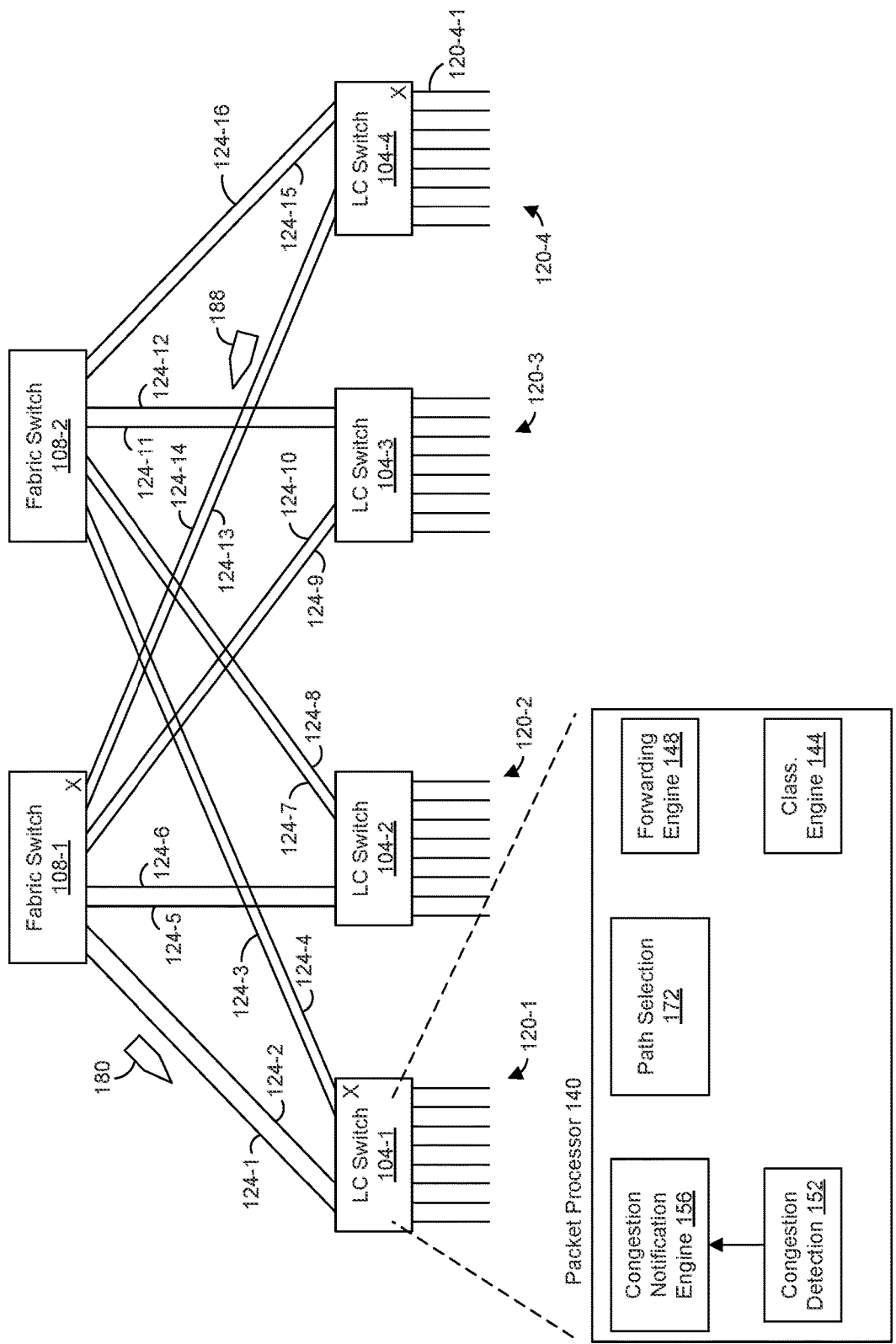
FIG. 1 is a block diagram of an example network switching system that is configured to forward packet through the network switching system along multiple alternative paths, and that selects paths for packets based on congestion messages, according to an embodiment.

FIG. 1 is a block diagram of an example network switching system 100 that utilizes load balancing techniques to efficiently forward traffic over multiple available paths between network devices, according to an embodiment. The network switching system 100 is suitable for use in data centers, server farms, or any other suitable systems that require switching or routing between a large number of network interfaces (e.g., ports), in an embodiment. The network switching system 100 includes a plurality of network devices 104, 108. In the embodiment of FIG. 1, the network devices 104, 108 are arranged in a hierarchical topology. In an example of this topology, the network devices 104, 108 include a plurality of first-stage switching devices 104, also referred to herein as "line card switches" or "LC switches," and a plurality of second-stage switching devices 108, also referred to herein as "fabric switches." The LC switches 104 and the fabric switches 108 are interconnected via a plurality of network links. In an embodiment, the plurality of network links interconnect each of at least some LC switches to multiple fabric switches 108. Similarly, the plurality of network links interconnect each of at least some fabric switches 108 to multiple LC switches 104.

In an embodiment, each of at least some LC switches 104 includes a plurality of downlink network interfaces (not shown) for coupling the LC switch 104 to a plurality of network links 120. The network links 120 communicatively couple the network switching system 100 to networks, devices in the networks, servers, storage devices, or other host systems or devices between which network packets are forwarded in the network switching system 100. Each of at least some LC switches 104 also includes a plurality of uplink network interfaces (not shown) for coupling the LC switch 104 to fabric switches 108 via network links 124. Examples of a network interfaces include ports, trunks, virtual ports, etc., and network interfaces are sometimes referred to herein as "ports" for ease of explanation.

Each of at least some fabric switches 108 includes a plurality of ports (not shown) for coupling the fabric switch 108 to LC switches 104 via the network links 124.

In an embodiment, the numbers of LC switches 104 and fabric switches 108 are generally determined by system requirements. For example, the number of alternative paths available for transmission of data between any two LC switches 104 is based generally on the number of fabric switches 108, in an embodiment. Accordingly, the numbers of fabric switches 108 in the network 100 may be selected according to bandwidth requirements for transmission of data between the LC switches 104, in an embodiment. The number of LC switches 104 in the network 100, on the other hand, is determined by a number of downlink ports needed by the network switching system 100 for connecting to networks, devices in the networks, servers, storage device, or other host systems or devices, etc., in an embodiment.

When an LC switch 104 receives a packet via a downlink port and is to transmit the packet into the network switching system 100 via an uplink port, the LC switch 104 is acting as a source device or a "source LC", according to an embodiment. On the other hand, when a LC switch 104 receives a packet via an uplink port and is to transmit the packet from the network switching system 100 via a downlink port, the LC switch 104 is acting as a target device or a "target LC", according to an embodiment.

Each of at least some of the LC switches 104 includes a packet processor 140. The packet processor 140 includes a classification engine 144 that is configured to determine, for at least some packets received by the LC switch 104, packet flows to which the packets belong. Generally, a packet flow is a group of packets from a common source device having a set of one or more common characteristics. As one example, a packet flow corresponds to packets having a same source address and a same destination address. As another example, a packet flow corresponds to packets having a same source address, a same destination address, and having a same protocol type. As another example, a packet flow corresponds to packets having a same source address, a same destination address, a same transmission control protocol (TCP)/user datagram protocol (UDP) source port, a same TCP/UDP destination port, and having a same protocol type. In other embodiments and/or scenarios, a packet flow corresponds to packets additionally or alternatively having one or more other common characteristics. Thus, in some embodiments, the classification engine 144 is configured to determine a packet flow to which a packet belongs based on at least header information in one or more headers of the packet (e.g., one of, or any suitable combination of two or more of: a source address, a destination address, a TCP/UDP source port, a TCP/UDP destination port, and a protocol type, etc.).

The packet processor 140 also includes a forwarding engine 148 that is configured to analyze information in a packet (e.g., one or more of in a header of the packet, in a tag added to the packet by another network device in the switching system 100, etc.) to determine one or more ports of the LC switch 104 to which the packet is to be forwarded. For example, when a packet is received via one of the downlink ports of the LC switch 104 (e.g., the LC switch 104 is acting as a source LC), the forwarding engine 148 analyzes one or more of network addresses in a header of the packet to determine to which one or more other ports of the LC switch 104 the packet is to be forwarded for transmission, according to an embodiment. In some embodiments, different uplink ports of the LC switch 104 respectively correspond to multiple alternative network paths to a target LC. Thus, in some embodiments, when the forwarding engine 148 determines that a packet is to be forwarded to a target LC, the packet processor 140 uses load balancing techniques to select one of the uplink ports for transmitting the packet.

In some embodiments, each of the uplink ports of each LC switch 104 is communicatively coupled to the other LC switches 104 via one or more fabric switches 108. Thus, in some embodiments, each of the uplink ports of the LC switch 104 provides an alternative path to any other LC switch 104. In at least some such embodiments, the packet processor 140 uses load balancing techniques to select, from all of the uplink ports, one of the uplink ports for transmitting the packet.

In some embodiments, a group of ports act as a trunk, a link aggregate group (LAG), etc., each port of the group providing an alternative path to a same target device. Thus, in some such embodiments, the forwarding engine 148 determines that a packet is to be forwarded to a group of ports for transmission, and the packet processor 140 uses load balancing techniques to select one of the ports in the group for transmitting the packet.

The forwarding engine 148 includes and/or is coupled to one or more forwarding databases (not shown) that include associations between network address information and ports of the LC switch 104. In an embodiment, the forwarding engine 148 uses information in the one or more forwarding databases, and information in the header of a packet, to determine a port or a group of ports via which a packet is to be transmitted.

The packet processor 140 also includes a congestion detection engine 152 that is configured to detect congestion corresponding to packet flows being transmitted by the LC switch 104. For example, in response to the LC switch 104 dropping a packet due to congestion, the congestion detection engine 152 determines that there is congestion occurring with respect to a packet flow to which the packet belongs. As another example, when the packet processor 140 adds a packet to a queue for transmission by the LC switch 104 and determines that a fill level of the queue is above a threshold, the congestion detection engine 152 determines that there is congestion occurring with respect to a packet flow to which the packet belongs. As another example, in response to the LC switch 104 receiving a flow control message from another network device via one of the ports of the LC switch 104, the flow control message indicating congestion at the other network device corresponding to one or more packet flows, the congestion detection engine 152 determines that there is congestion occurring with respect to the one or more packet flows.

The packet processor 140 also includes a congestion notification engine 156 that is configured to generate congestion messages that indicate the network device has detected congestion. In some embodiments, each of at least some congestion messages includes an indication of a packet flow corresponding to the congestion. In some embodiments, each congestion message additionally or alternatively includes an indication of a source network device (e.g., a source LC) of the packet flow within the network. For example, the congestion notification engine 156 determines the source LC based on a tag attached to the packet that includes an identifier of the source LC for the packet, in an embodiment.

When the congestion detection engine 152 detects congestion in connection with a packet flow being received from a particular fabric switch 108, the congestion notification engine 156 sends a congestion message to the particular fabric switch 108, in an embodiment. The particular fabric switch 108 then forwards the congestion message to the source LC corresponding to the packet flow, in an embodiment. For example, in embodiments in which the congestion message includes an identifier of the source LC, the particular fabric switch 108 forwards the congestion message to the source LC based on identifier of the source LC in the congestion message. In other embodiments, the fabric switch 108 maintains a database of packet flow/source LC associations and forwards the congestion message to the source LC based on i) an identifier of the packet flow in the congestion message, and ii) the database of packet flow/source LC associations.

When the congestion detection engine 152 detects congestion in connection with a packet flow being received by the LC switch 104 from a downlink port of the LC switch 104, the congestion notification engine 156 generates an internal congestion message, in an embodiment. As discussed further below, the internal congestion message prompts the packet processor 140 to select a new path, among multiple alternative paths through the switching system 100, for forwarding packets through the switching system 100.

Congestion detection techniques performed by the congestion detection engine 152, as described above, are based on measuring congestion locally at the LC switch 104 and do not require congestion measurements performed at any other network devices in the network switching system 100, at least in some embodiments. Accordingly, the congestion detection techniques performed by the congestion detection engine 152, as described above, are readily scalable as the number of network devices in the network switching system 100 increases, at least in some embodiments.

The packet processor 140 also includes a path selection engine 172 that is configured to select paths through the network switching system 100 for packets being transmitted by the LC switch 104 (acting as a source LC) via uplink ports of the LC switch 104. In an embodiment, when a new packet flow (being received via a downlink port) is detected by the packet processor 140, the path selection engine 172 makes an initial path selection to select an initial uplink port for transmitting packets in the packet flow, the initial uplink port being selected from multiple uplink ports of the LC switch 104 corresponding to multiple alternative paths through the network switching system 100 for packets in the packet flow. In an embodiment, the path processor 140 maintains the initial path selection for subsequent packets in the packet flow until an event that prompts a subsequent path selection decision for packets in the packet flow, such as receiving a congestion message corresponding to the packet flow, detecting a link failure corresponding to the initial uplink port, detecting a failure of the initial uplink port, etc.

The path selection engine 172 is configured to select a new path through the network switching system 100 for a packet flow in response to receiving a congestion message corresponding to the packet flow, according to an embodiment. For example, in response to receiving, at a source LC of a packet flow, a congestion message from an intermediate network device in the network switching system 100 (i.e., a network device between the source LC and a target LC of the packet flow, such as a fabric switch 108), the path selection engine 172 makes a new path selection to select a new uplink port for transmitting packets in the packet flow, the new uplink port being selected from the multiple uplink ports of the LC switch 104 corresponding to the multiple alternative paths through the network switching system 100 for packets in the packet flow. As another example, in response to receiving an internal congestion message, the path selection engine 172 makes a new path selection to select a new uplink port for transmitting packets in the packet flow, the new uplink port being selected from the multiple uplink ports of the LC switch 104 corresponding to the multiple alternative paths through the network switching system 100 for packets in the packet flow.

In an embodiment, the path selection engine 172 is configured to select a path, from among multiple alternative paths through the network switching system 100, pseudo-randomly. In other embodiments, the path selection engine 172 is configured to select a path, from among multiple alternative paths through the network switching system 100, using a suitable non-pseudorandom technique, such as successively selecting alternative paths from an ordered list of alternative paths.

In an embodiment, the path selection engine 172 is configured to select a path, from among multiple alternative paths through the network switching system 100, based on a state variable (referred to herein as a "SALT") that remains at a same value while the path selection is to remain static. When a new path selection for the packet flow is to be made, the path selection engine 172 chooses a new SALT and selects a path, from among the multiple alternative paths, based on the new SALT. In an embodiment, selecting a path, from among multiple alternative paths through the network switching system 100, based on the SALT comprises selecting an uplink port, from among multiple uplink ports, based on the SALT.

In an embodiment, the path selection engine 172 is configured to select a path for a packet, from among multiple alternative paths through the network switching system 100, based on calculating, using a hash function, a hash on at least one or more header fields in the packet. When the one or more header fields used for calculating the hash have common values amongst packets that belong to a packet flow, the path selection engine 172 generally selects a same path for multiple packets in the packet flow.

In an embodiment, the path selection engine 172 is configured to select a path for a packet, from among multiple alternative paths through the network switching system 100, based on calculating, using a hash function, a hash on at least i) one or more header fields in the packet, and ii) a SALT corresponding to the packet (e.g., a SALT chosen for the flow to which the packet belongs). When the one or more header fields used for calculating the hash have common values amongst packets that belong to a packet flow, the path selection engine 172 selects a same path for multiple packets in the packet flow while the SALT is at a same value, in an embodiment. When the SALT is changed to a new value, the path selection engine 172 generally selects a new path for multiple packets subsequently transmitted in the packet flow, according to an embodiment.

In an embodiment, a packet processor 104 of a source LC includes, in a tag attached to a packet, the SALT used by the source LC for selecting a path for the packet. As will be discussed below, when an intermediate network device in the packet switching system 100 (i.e., a network device between the source LC and the target LC) receives a packet, the intermediate network device uses the SALT in the tag of the packet to make a path selection decision for the packet. Thus, when a source LC changes the SALT used for a packet flow, an intermediate network device that receives packets in the packet flow will also use the new SALT for selecting, at the intermediate network device, a path for transmitting packets in the packet flow. In an embodiment, the intermediate network device selecting a path, from among multiple alternative paths, based on the SALT comprises the intermediate network device selecting a port, from among multiple ports, based on the SALT.

In another embodiment, the path selection engine 172 is configured to select a hash function, from among multiple alternative hash functions, for use in calculating a hash of at least one or more header fields of a packet. When a new path selection for the packet flow is to be made, the path selection engine 172 chooses a new hash function and selects a path, from among the multiple alternative paths, using the new hash function. In an embodiment, selecting a path, from among multiple alternative paths through the network switching system 100, using a hash function, selected from a group of alternative hash functions, comprises selecting an uplink port, from among multiple uplink ports, using the hash function that is selected from the group of alternative hash functions.

In an embodiment, the path selection engine 172 is configured to select a path for a packet, from among multiple alternative paths through the network switching system 100, based on calculating, using a hash function, a hash on at least one or more header fields in the packet, the hash function having been selected from a group of alternative hash functions. When the one or more header fields used for calculating the hash have common values amongst packets that belong to a packet flow, the path selection engine 172 selects a same path for multiple packets in the packet flow while using the same hash function, in an embodiment. When a different hash function is selected, the path selection engine 172 generally selects a new path for multiple packets subsequently transmitted in the packet flow, according to an embodiment.

Path selection techniques performed by the path selection engine 172, as described above, do not require comparing respective load levels of respective alternative paths in the network switching system 100, at least in some embodiments. Rather, the path selection engine 172 selects new paths on essentially a "trial and error" basis without regard to current loads of the alternative paths, at least in some embodiments. For example, if the path selection engine 172 selects a new path that is already congested, a new congestion notification will quickly be received, prompting the path selection engine 172 to select another path, and the process will repeat until an appropriate path is selected, at least in some embodiments. Accordingly, the path detection techniques performed by the path selection engine 172, as described above, are readily scalable as the number of network devices and the number of alternative paths in the network switching system 100 increase, at least in some embodiments.

In an embodiment, a packet processor 104 of a source LC includes, in a tag attached to a packet, an indication of a hash function used by the source LC for selecting a path for the packet. As will be discussed below, when an intermediate network device in the packet switching system 100 (i.e., a network device between the source LC and the target LC) receives a packet, the intermediate network device uses the hash function in the tag of the packet to make a path selection decision for the packet. Thus, when a source LC changes the hash function used for a packet flow, an intermediate network device that receives packets in the packet flow will also use the new hash function for selecting, at the intermediate network device, a path for transmitting packets in the packet flow. In an embodiment, the intermediate network device selecting a path, from among multiple alternative paths, using the hash function comprises the intermediate network device selecting a port, from among multiple ports, using the hash function.

Each of at least some of the fabric switches 108 includes a packet processor (not shown) similar to the packet processor 140. For example, the packet processor of the fabric switch 108 includes a classification engine similar to the classification engine 144 that is configured to determine, for at least some packets received by the fabric switch 108, packet flows to which the packets belong based on information in a packet (e.g., one or more of in a header of the packet, in a tag added to the packet by another network device in the switching system 100, etc.).

The packet processor of the fabric switch 108 also includes a forwarding engine similar to the forwarding engine 148 that is configured to analyze information in a packet (e.g., one or more of in a header of the packet, in a tag added to the packet by another network device in the switching system 100, etc.) to determine one or more ports of the fabric switch 108 to which the packet is to be forwarded. For example, the forwarding engine 148 analyzes one or more of network addresses in a header of the packet to determine to which one or more other ports of the fabric switch 108 the packet is to be forwarded for transmission, according to an embodiment. Thus, in some embodiments, when the forwarding engine determines that a packet is to be forwarded to a target LC, the packet processor 140 uses load balancing techniques to select one of the uplink ports for transmitting the packet.

In some embodiments, a group of ports of the fabric switch 108 act as a trunk, a LAG, etc., each port of the group providing an alternative network link to a same destination device. Thus, in some embodiments, the forwarding engine determines that a packet is to be forwarded to a group of ports for transmission, and the packet processor of the fabric switch 108 uses load balancing techniques to select one of the ports in the group for transmitting the packet.

The forwarding engine of the fabric switch 108 includes and/or is coupled to one or more forwarding databases (not shown) that include associations between network address information and ports of the fabric switch 108. In an embodiment, the forwarding engine uses information in the one or more forwarding databases, and information in the header of a packet and/or in a tag added to the packet, to determine a port or a group of ports via which a packet is to be transmitted.

The packet processor of the fabric switch 108 also includes a congestion detection engine similar to the congestion detection engine 152 that is configured to detect congestion corresponding to packet flows being transmitted by the fabric switch 108. For example, in response to the fabric switch 108 dropping a packet due to congestion, the congestion detection engine of the fabric switch 108 determines that there is congestion occurring with respect to a packet flow to which the packet belongs. As another example, when the packet processor adds a packet to a queue for transmission by the fabric switch 108 and determines that a fill level of the queue is above a threshold, the congestion detection engine determines that there is congestion occurring with respect to a packet flow to which the packet belongs.

Congestion detection techniques performed by the congestion detection engine 152, as described above, are based on measuring congestion locally at the LC switch 104 and do not require congestion measurements performed at any other network devices in the network switching system 100, at least in some embodiments. Accordingly, the congestion detection techniques performed by the congestion detection engine 152, as described above, are readily scalable as the number of network devices in the network switching system 100 increases, at least in some embodiments.

The packet processor of the fabric switch 108 also includes a congestion notification engine similar to the congestion notification engine 156 that is configured to generate congestion messages that indicate the network device has detected congestion. In some embodiments, each of at least some congestion messages includes an indication of a packet flow corresponding to the congestion. In some embodiments, each congestion message additionally or alternatively includes an indication of a source network device (e.g., a source LC) of the packet flow within the network. For example, the congestion notification engine of the fabric switch 108 determines the source LC based on a tag attached to the packet that includes an identifier of the source LC for the packet, in an embodiment.

When the congestion detection engine of the fabric switch 108 detects congestion in connection with a packet flow being received from a particular source LC, the congestion notification engine 156 sends a congestion message to the particular source LC, in an embodiment.

The packet processor of the fabric switch 108 also includes a path selection engine (not shown) similar to the path selection engine 172 that is configured to select paths through the network switching system 100 for packets being transmitted by the fabric switch 108. In an embodiment, the path selection unit of the fabric switch 108 is configured to select a path, from among multiple alternative paths through the network switching system 100, pseudorandomly. In an embodiment, the path selection unit of the fabric switch 108 is configured to select a path, from among multiple alternative paths through the network switching system 100, using a suitable non-pseudorandom technique. In an embodiment, the path selection unit is configured to select a path, from among multiple alternative paths through the network switching system 100, based on a SALT (e.g., the path is selected based on calculating, using a hash function, a hash on at least i) one or more header fields in the packet, and ii) the SALT corresponding to the packet). In an embodiment, the path selection unit is configured to select a path, from among multiple alternative paths through the network switching system 100, using a hash function.

As discussed above, a source LC includes, in a tag attached to a packet, the SALT used by the source LC for selecting a path for the packet, according to an embodiment. In such embodiments, when the fabric switch 108 receives a packet, the path selection engine of the fabric switch 108 uses the SALT in the tag of the packet to make a path selection decision for the packet. Thus, when a source LC changes the SALT used for a packet flow, the fabric switch 108 will also use the new SALT for selecting, at the fabric switch, a path for transmitting packets in the packet flow. In an embodiment, the fabric switch 108 selecting a path, from among multiple alternative paths, based on the SALT comprises the intermediate network device selecting a port, from among multiple uplink ports, based on the SALT.

As discussed above, a source LC includes, in a tag attached to a packet, an indication of a hash function used by the source LC for selecting a path for the packet, according to an embodiment. In such embodiments, when the fabric switch 108 receives a packet, the path selection engine of the fabric switch 108 uses the hash function indicated in the tag of the packet to make a path selection decision for the packet. Thus, when a source LC changes the hash function used for a packet flow, the fabric switch 108 will also use the new hash function for selecting, at the fabric switch, a path for transmitting packets in the packet flow. In an embodiment, the fabric switch 108 selecting a path, from among multiple alternative paths, using the hash function indicated in the tag comprises the intermediate network device selecting a port, from among multiple uplink ports, using the hash function.

Path selection techniques performed by the path selection engine of the fabric switch 108 do not require comparing respective load levels of respective alternative paths in the network switching system 100, at least in some embodiments. Rather, the path selection engine selects new paths on essentially a "trial and error" basis without regard to current loads of the alternative paths, at least in some embodiments. For example, if the path selection engine selects a new path that is already congested, a new congestion notification will quickly be received, prompting the path selection engine to select another path, and the process will repeat until an appropriate path is selected, at least in some embodiments. Accordingly, the path detection techniques performed by the path selection engine of the fabric switch 108 are readily scalable as the number of network devices and the number of alternative paths in the network switching system 100 increase, at least in some embodiments.

In the example of FIG. 1, the fabric switch 108-1 detects congestion corresponding to the transmission, by the fabric switch 108-1, of a first packet flow via the network link 124-14 (signified by the "X" in the fabric switch 108-1). The first packet flow was received at the fabric switch 108-1 from the LC switch 104-1. In response to detecting the congestion, the fabric switch 108-1 generates a congestion message 180 and transmits the congestion message 180 to the LC switch 104-1. In response to the congestion message 180, the LC switch 104-1 selects a new path for the first packet flow and begins transmitting the first packet flow along the new path.

Also in the example of FIG. 1, the LC switch 104-1 detects congestion corresponding to the transmission, by the LC switch 104-1, of a second packet flow via the network link 124-4 (signified by the "X" in the LC switch 104-1). In response to detecting the congestion, the LC switch 104-1 generates an internal congestion message (not shown). In response to the internal congestion message, the LC switch 104-1 selects a new path for the second packet flow and begins transmitting the second packet flow along the new path.

Also in the example of FIG. 1, the LC switch 104-4 detects congestion corresponding to the transmission, by the LC switch 104-4, of a third packet flow via the network link 120-4-1 (signified by the "X" in the LC switch 104-4). The third packet flow was received at the LC switch 104-4 from the fabric switch 108-1, and the third packet flow was received at the fabric switch 108-1 from the LC switch 104-1 (the source LC of the third packet flow). In this scenario, the congestion experienced by the LC switch 104-4 cannot be mitigated by changing a path through the network switching system 100 for the third packet flow.

In response to detecting the congestion, the LC switch 104-4 generates a congestion message 188 and sends the congestion message 188 to the fabric switch 108-1, and the fabric switch 108-1 forwards the congestion message 188 to the LC switch 104-1. In response to the congestion message 188, the LC switch 104-1 pauses sending packets belonging to the third packet flow to the fabric switch 108-1, in an embodiment. In another embodiment, the LC switch 104-1 begins dropping packets belonging to the third packet flow in response to the congestion message 188. In another embodiment, the LC switch 104-1 reduces a transmit rate at which the LC switch 104-1 sends packets belonging to the third packet flow to the fabric switch 108-1 in response to the congestion message 188.

Figure 2:
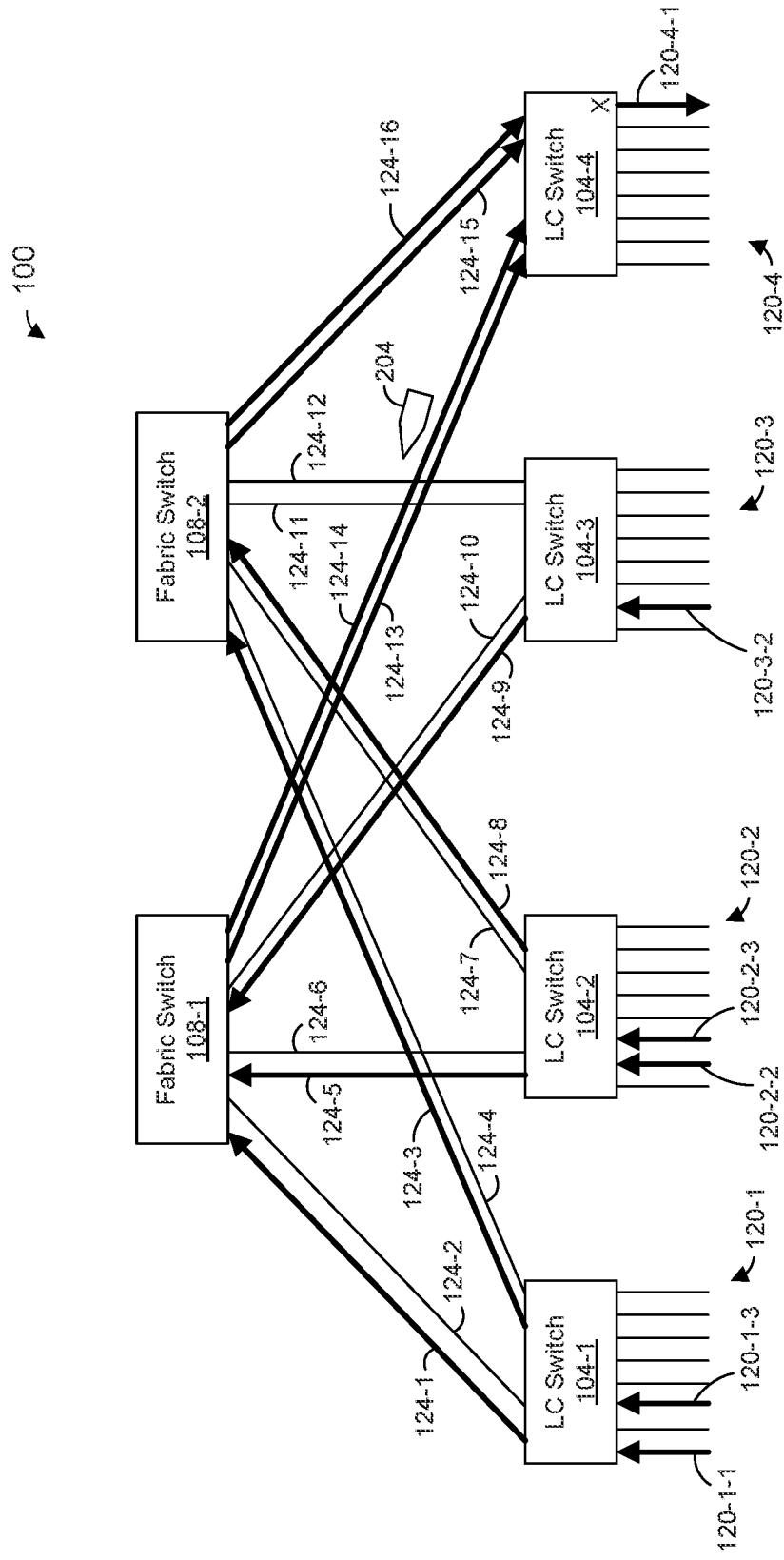
FIG. 2 is an illustration of an example congestion scenario in the networking system of FIG. 1, according to an embodiment.

FIG. 2 is an illustration of an example congestion scenario in the networking system 100 of FIG. 1, according to an embodiment. In the example scenario of FIG. 2, multiple packet flows being received by the network switching system 100 at LC switch 104-1, LC switch 104-2, and LC switch 104-3 are all being transmitted from the network switching system 100 by the LC switch 104-4 via the network link 120-4-1. Such a congestion scenario is sometimes referred to as a "many-to-one" congestion scenario.

In particular, a first packet flow is received at LC switch 104-1 via the network link 120-1-1, and the LC switch 104-1 transmits the first packet flow to the fabric switch 108-1 via the network link 124-1. The fabric switch 108-1 transmits the first packet flow to the LC switch 104-4 via the network link 124-13, and the LC switch 104-4 transmits the first packet flow via the network link 120-4-1. A second packet flow is received at LC switch 104-1 via the network link 120-1-3, and the LC switch 104-1 transmits the second packet flow to the fabric switch 108-2 via the network link 124-3. The fabric switch 108-2 transmits the second packet flow to the LC switch 104-4 via the network link 124-15, and the LC switch 104-4 transmits the second packet flow via the network link 120-4-1.

A third packet flow is received at LC switch 104-2 via the network link 120-2-2, and the LC switch 104-2 transmits the third packet flow to the fabric switch 108-1 via the network link 124-5. The fabric switch 108-1 transmits the third packet flow to the LC switch 104-4 via the network link 124-13, and the LC switch 104-4 transmits the third packet flow via the network link 120-4-1. A fourth packet flow is received at LC switch 104-2 via the network link 120-2-3, and the LC switch 104-1 transmits the fourth packet flow to the fabric switch 108-2 via the network link 124-8. The fabric switch 108-2 transmits the fourth packet flow to the LC switch 104-4 via the network link 124-16, and the LC switch 104-4 transmits the fourth packet flow via the network link 120-4-1.

A fifth packet flow is received at LC switch 104-3 via the network link 120-3-2, and the LC switch 104-3 transmits the fifth packet flow to the fabric switch 108-1 via the network link 124-9. The fabric switch 108-1 transmits the fifth packet flow to the LC switch 104-4 via the network link 124-14, and the LC switch 104-4 transmits the fifth packet flow via the network link 120-4-1.

At least partly because of the transmission of the multiple packet flows via the one network link 120-4-1, the LC switch 104-1 detects congestion corresponding to the transmission, by the LC switch 104-4, of the first packet flow via the network link 120-4-1 (signified by the "X" in the LC switch 104-4). The first packet flow was received at the LC switch 104-4 from the fabric switch 108-1, and the first packet flow was received at the fabric switch 108-1 from the LC switch 104-1 (the source LC of the first packet flow). In this scenario, the congestion experienced by the LC switch 104-4 cannot be mitigated by changing the path through the network switching system 100 for the first packet flow.

In response to detecting the congestion, the LC switch 104-4 generates a congestion message 204 and sends the congestion message 204 to the fabric switch 108-1, and the fabric switch 108-1 forwards the congestion message 204 to the LC switch 104-1. In response to the congestion message 204, the LC switch 104-1 pauses sending packets belonging to the first packet flow to the fabric switch 108-1, in an embodiment. In another embodiment, the LC switch 104-1 begins dropping packets belonging to the first packet flow in response to the congestion message 204. In another embodiment, the LC switch 104-1 reduces a transmit rate at which the LC switch 104-1 sends packets belonging to the first packet flow to the fabric switch 108-1 in response to the congestion message 204.

Figure 3:
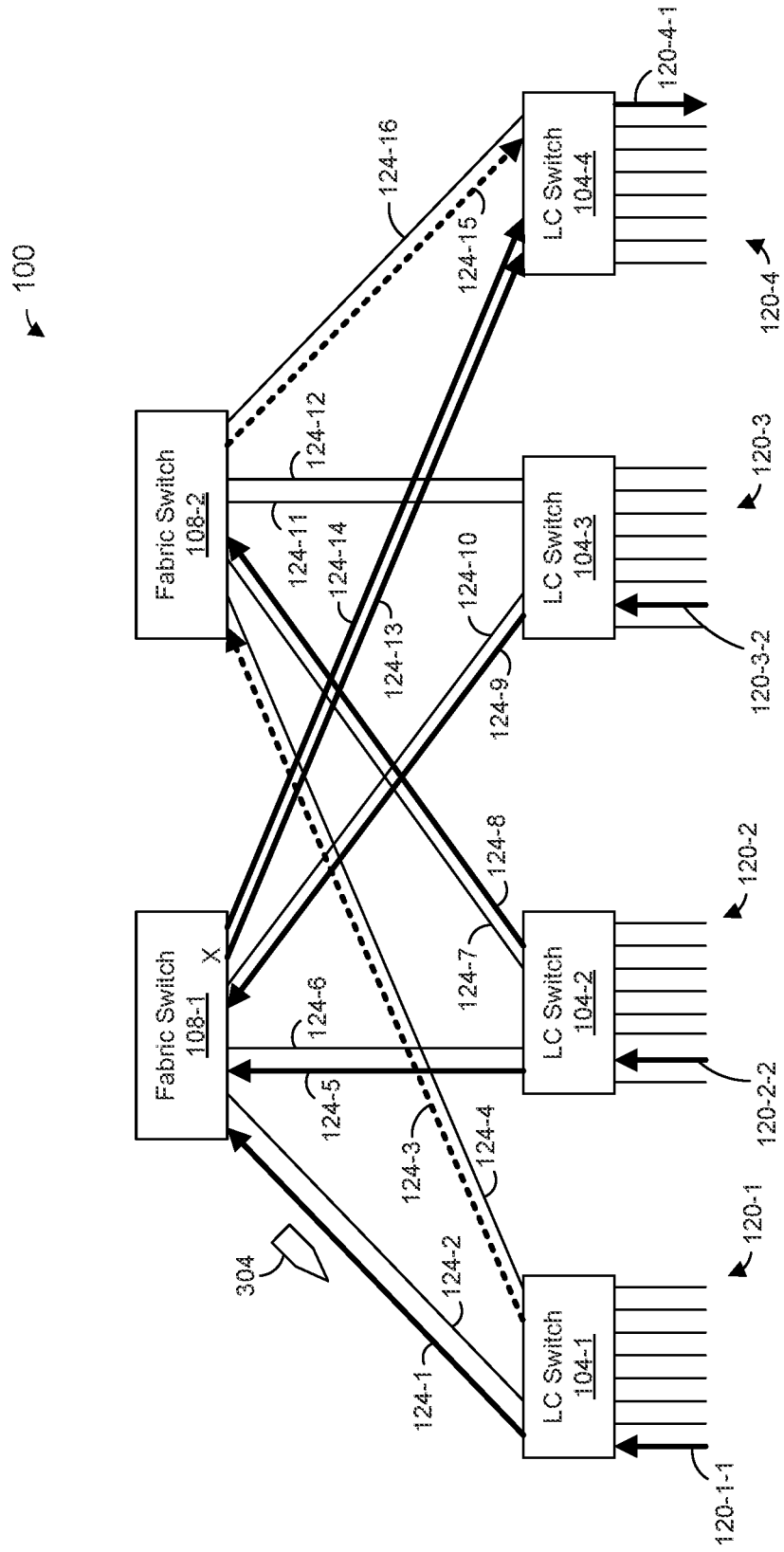
FIG. 3 is an illustration of another example congestion scenario in the networking system of FIG. 1, according to another embodiment.

FIG. 3 is an illustration of another example congestion scenario in the networking system 100 of FIG. 1, according to an embodiment. In the example scenario of FIG. 3, multiple packet flows being received by the network switching system 100 at LC switch 104-1, LC switch 104-2, and LC switch 104-3 are all being forwarded to the LC switch 104-4 via the fabric switch 108-1. Such a congestion scenario reflects suboptimal load balancing between the fabric switch 108-1 and the fabric switch 108-2.

A first packet flow is received at LC switch 104-1 via the network link 120-1-1, and the LC switch 104-1 transmits the first packet flow to the fabric switch 108-1 via the network link 124-1. The fabric switch 108-1 transmits the first packet flow to the LC switch 104-4 via the network link 124-13, and the LC switch 104-4 transmits the first packet flow via the network link 120-4-1.

A second packet flow is received at LC switch 104-2 via the network link 120-2-2, and the LC switch 104-2 transmits the second packet flow to the fabric switch 108-1 via the network link 124-5. The fabric switch 108-1 transmits the second packet flow to the LC switch 104-4 via the network link 124-13, and the LC switch 104-4 transmits the second packet flow via the network link 120-4-1.

A third packet flow is received at LC switch 104-3 via the network link 120-3-2, and the LC switch 104-3 transmits the third packet flow to the fabric switch 108-1 via the network link 124-9. The fabric switch 108-1 transmits the third packet flow to the LC switch 104-4 via the network link 124-14, and the LC switch 104-4 transmits the third packet flow via the network link 120-4-1.

At least partly because of the transmission of the multiple packet flows to the LC switch 104-4 via the one fabric switch 108-1, the fabric switch 108-1 detects congestion corresponding to the transmission, by the fabric switch 108-1, of the first packet flow via the network link 124-13 (signified by the "X" in the fabric switch 108-1). The first packet flow was received at the fabric switch 108-1 from the LC switch 104-1 (the source LC of the first packet flow).

In response to detecting the congestion, the fabric switch 108-1 generates a congestion message 304 and sends the congestion message 304 to the LC switch 104-1. In response to the congestion message 304, the LC switch 104-1 selects an alternative path for the first packet flow. For example, the LC switch 104-1 selects the network link 124-3 for transmitting packets in the first packet flow. Thus, the LC switch 104-1 begins transmitting packets in the first packet flow to the fabric switch 108-2 via the network link 124-3, and the fabric switch 108-2 forwards the packets in the first packet flow to the LC switch 104-4 via the network link 124-15.

Figure 4:
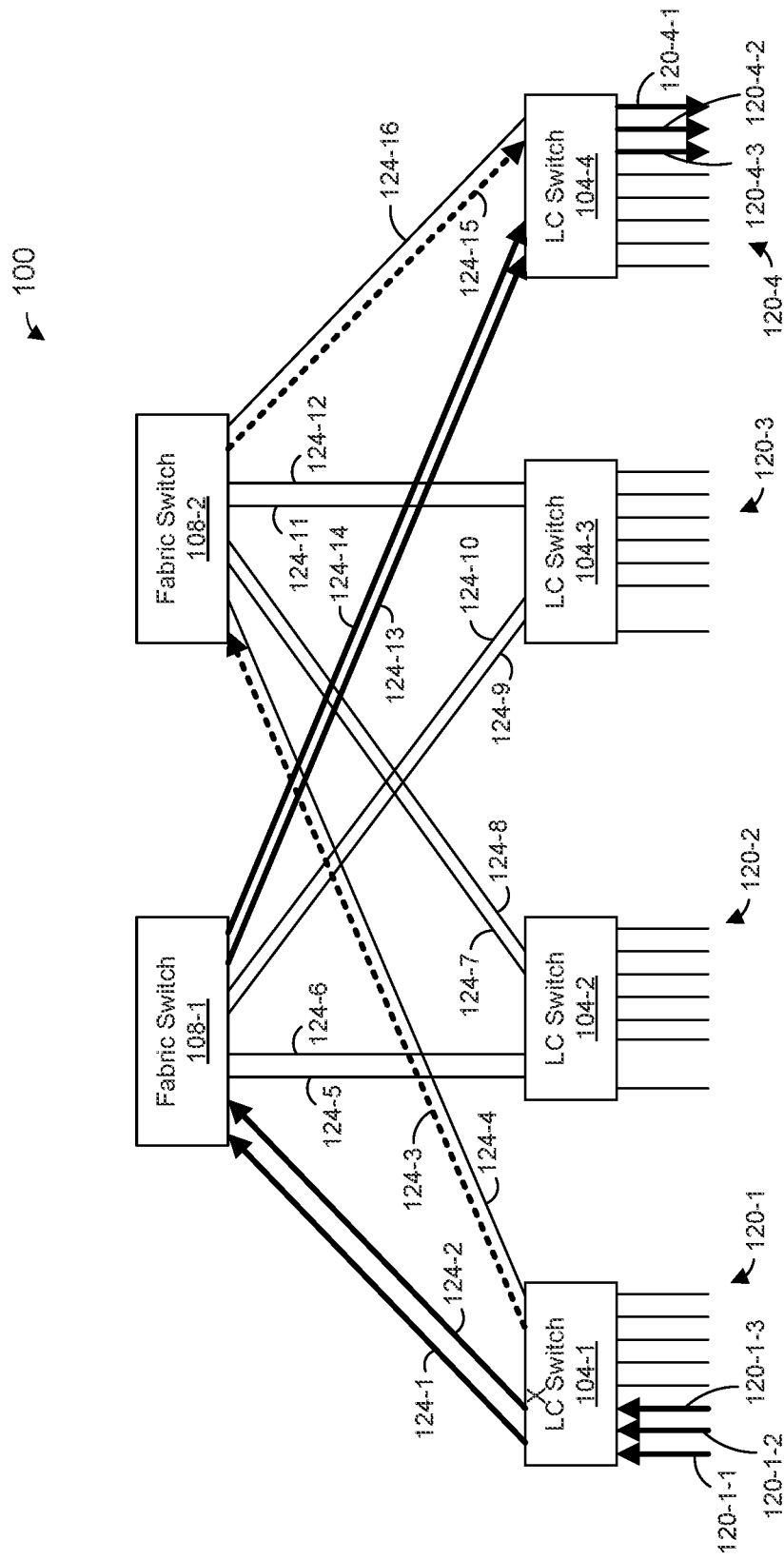
FIG. 4 is an illustration of another example congestion scenario in the networking system of FIG. 1, according to another embodiment.

FIG. 4 is an illustration of another example congestion scenario in the networking system 100 of FIG. 1, according to an embodiment. In the example scenario of FIG. 4, multiple packet flows being received by the network switching system 100 at LC switch 104-1 are all being forwarded to the LC switch 104-4 via the network links 124-1 and 124-2. Such a congestion scenario reflects suboptimal load balancing between the uplink ports of the LC switch 104-1.

A first packet flow is received at LC switch 104-1 via the network link 120-1-1, and the LC switch 104-1 transmits the first packet flow to the fabric switch 108-1 via the network link 124-1. The fabric switch 108-1 transmits the first packet flow to the LC switch 104-4 via the network link 124-13, and the LC switch 104-4 transmits the first packet flow via the network link 120-4-1.

A second packet flow is received at LC switch 104-1 via the network link 120-1-2, and the LC switch 104-1 transmits the second packet flow to the fabric switch 108-1 via the network link 124-2. The fabric switch 108-1 transmits the second packet flow to the LC switch 104-4 via the network link 124-13, and the LC switch 104-4 transmits the second packet flow via the network link 120-4-2.

A third packet flow is received at LC switch 104-1 via the network link 120-1-3, and the LC switch 104-1 transmits the third packet flow to the fabric switch 108-1 via the network link 124-2. The fabric switch 108-1 transmits the third packet flow to the LC switch 104-4 via the network link 124-14, and the LC switch 104-4 transmits the third packet flow via the network link 120-4-3.

At least partly because of the transmission of the multiple packet flows by the LC switch 104-1 via the network link 124-2 the LC switch 104-1 detects congestion corresponding to the transmission, by the LC switch 104-1, of the third packet flow via the network link 124-2 (signified by the "X" in the LC switch 104-1).

In response to detecting the congestion, the LC switch 104-1 generates an internal congestion message (not shown). In response to the internal congestion message, the LC switch 104-1 selects an alternative path for the third packet flow. For example, the LC switch 104-1 selects the network link 124-3 for transmitting packets in the third packet flow. Thus, the LC switch 104-1 begins transmitting packets in the third packet flow to the fabric switch 108-2 via the network link 124-3, and the fabric switch 108-2 forwards the packets in the third packet flow to the LC switch 104-4 via the network link 124-15.

Figure 5:
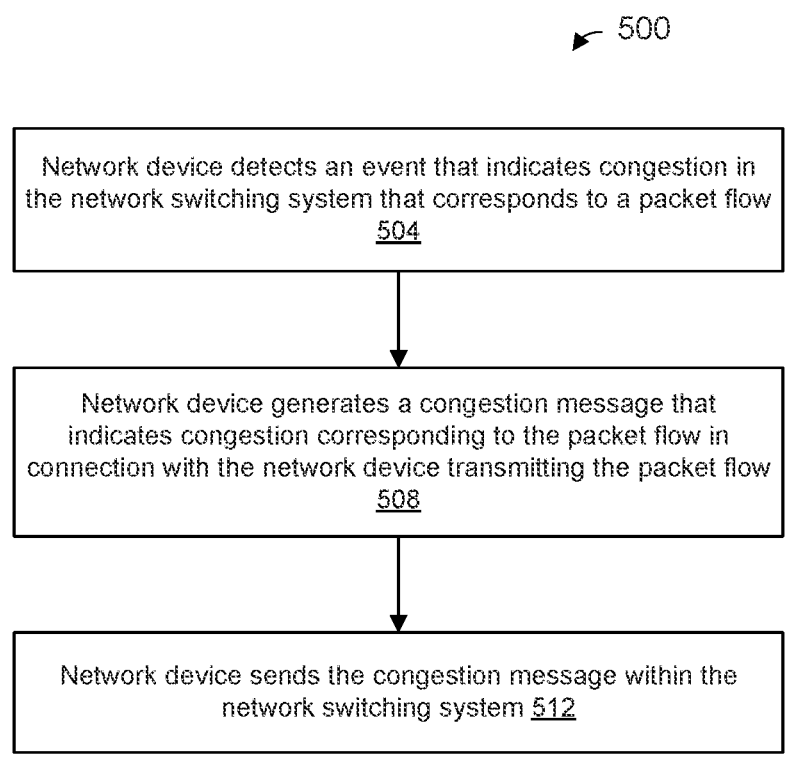
FIG. 5 is a flow diagram of an example method for signaling congestion associated with a network interface within the example network switching system of FIG. 1, according to an embodiment.

FIG. 5 is a flow diagram of an example method 500 for signaling congestion associated with a network interface within a network switching system, according to an embodiment. For example, the method 500 is implemented by an LC switch 104 in the network switching system 100 of FIG. 1, according to an embodiment. More specifically, the method 500 is implemented at least partially by the packet processor 140 (e.g., at least partially by the congestion detection engine 152 and/or the congestion notification engine 156), according to an illustrative embodiment. As another example, the method 500 is implemented by a fabric switch 108 in the network switching system 100 of FIG. 1, according to another embodiment. More specifically, the method 500 is implemented at least partially by a packet processor of the fabric switch 108 similar to the packet processor 140 (e.g., at least partially by a congestion detection engine and/or a congestion notification engine of the fabric switch 108), according to another illustrative embodiment. For explanatory purposes, the method 500 is described with reference to FIG. 1. In other embodiments, however, the method 500 is implemented by another suitable network device (different the LC switches 104 and the fabric switches 108) in another suitable network switching system other than the network switching system 100 of FIG. 1.

At block 504, a network device within the network switching system detects an event that indicates congestion in the network switching system that corresponds to a packet flow. For example, the packet processor 140 (e.g., the congestion detection engine 152 within the packet processor 140) in an LC switch 104 detects the event, in an embodiment. As another example, a packet processor (e.g., a congestion detection engine within the packet processor) in a fabric switch 108 detects the event, in another embodiment. Detecting the event at block 504 comprises detecting that a packet in the packet flow that was to be transmitted by the network device was dropped by the network device, in an embodiment. Detecting the event at block 504 comprises detecting that a fill level of a queue of the network device in which a packet in the packet flow was stored for transmission by the network device meets a threshold that indicates congestion, in an embodiment. Detecting the event at block 504 comprises detecting that another network device, which is external to the network switching system and to which the packet flow is being transmitted by the network device, sent a flow control message (e.g., a pause message) to the network device that indicates congestion associated with At block 508, the network device generates, in response to detecting the event at block 504, a congestion message that indicates the network device has detected congestion corresponding to transmission of the packet flow by the network device. For example, the packet processor 140 (e.g., the congestion notification engine 156 within the packet processor 140) in an LC switch 104 generates the congestion message, in an embodiment. As another example, a packet processor (e.g., a congestion notification engine within the packet processor) in a fabric switch 108 generates the congestion message, in another embodiment. In some embodiments, generating the congestion message at block 508 includes generating the congestion message to include an indication of the packet flow corresponding to the congestion. In some embodiments, generating the congestion message at block 508 includes generating the congestion message additionally or alternatively to include an indication of a source network device (e.g., a source LC) of the packet flow within the network switching system. For example, a packet processor of the network device (e.g., the packet processor 140, a packet processor of the fabric switch 108, etc.) determines the source LC based on a tag attached to a packet in the packet flow, the tag having an identifier of the source LC for the packet, and includes an identifier of the source LC in the congestion message, in an embodiment.

When the network device that detects that event that indicates congestion at block 504 is not the source LC for the packet flow, the congestion message generated at block 508 is generated to be suitable for forwarding the congestion message to the source LC through the network switching system 100, in an embodiment. When the network device that detects that event that indicates congestion at block 504 is also the source LC for the packet flow, the congestion message generated at block 508 is an internal congestion message that is generated to be suitable for sending the congestion message internally within the network device, in an embodiment.

At block 512, the network device sends the congestion message within the network switching system. For example, the packet processor 140 (e.g., the congestion notification engine 156 within the packet processor 140) in an LC switch 104 sends the congestion message, in an embodiment. As another example, a packet processor (e.g., a congestion notification engine within the packet processor) in a fabric switch 108 sends the congestion message, in another embodiment.

When the network device that detects that event that indicates congestion at block 504 is not the source LC for the packet flow, the network device sends the congestion message generated at block 508 to the source LC, in an embodiment. In an embodiment, sending the congestion message to the source LC comprises sending the congestion message to a particular fabric switch 108 via which the network device received packets in the packet flow, and the particular fabric switch 108 then forwards the congestion message to the source LC corresponding to the packet flow. For example, in embodiments in which the congestion message includes an identifier of the source LC, the particular fabric switch 108 forwards the congestion message to the source LC based on identifier of the source LC in the congestion message. In other embodiments, the fabric switch 108 maintains a database of packet flow/source LC associations and forwards the congestion message to the source LC based on i) an identifier of the packet flow in the congestion message, and ii) the database of packet flow/source LC associations.

When the network device that detects that event that indicates congestion at block 504 is also the source LC for the packet flow, the network device sends the internal congestion message generated at block 508 to a component within the network device, in an embodiment. For example, in some embodiments in which the network device is an LC switch 104, the congestion message is sent to the path selection engine 172.

Figure 6:
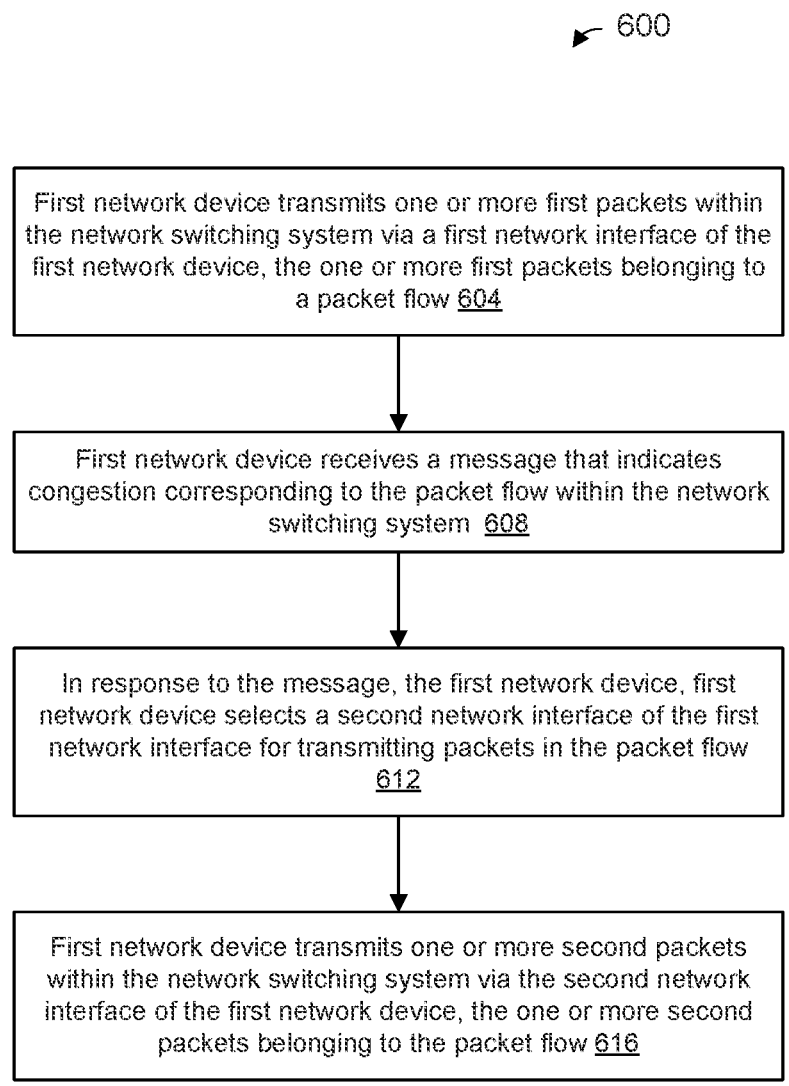
FIG. 6 is a flow diagram of an example method for load balancing based on congestion messages in the example network switching system of FIG. 1, according to an embodiment.

FIG. 6 is a flow diagram of an example method 500 for load balancing in a network switching system that includes a plurality of interconnected network devices, according to an embodiment. For example, the method 600 is implemented by an LC switch 104 in the network switching system 100 of FIG. 1, according to an embodiment. More specifically, the method 600 is implemented at least partially by the packet processor 140 (e.g., at least partially by the path selection engine 172), according to an illustrative embodiment. As another example, the method 600 is implemented by a fabric switch 108 in the network switching system 100 of FIG. 1, according to another embodiment. More specifically, the method 600 is implemented at least partially by a packet processor of the fabric switch 108 similar to the packet processor 140 (e.g., at least partially by a path selection engine of the fabric switch 108), according to another illustrative embodiment. For explanatory purposes, the method 600 is described with reference to FIG. 1. In other embodiments, however, the method 600 is implemented by another suitable network device (different the LC switches 104 and the fabric switches 108) in another suitable network switching system other than the network switching system 100 of FIG. 1.

At block 604, a first network device transmits one or more first packets within the network switching system via a first network interface of the first network device, the one or more first packets belonging to a packet flow. For example, the LC switch 104-1 transmits one or more first packets within the network switching system via a first uplink port of the LC switch 104-1, the one or more first packets belonging to a packet flow, in an embodiment. As another example, the fabric switch 108-1 transmits one or more first packets within the network switching system via a port of the fabric switch 108-1, the one or more first packets belonging to a packet flow, in an embodiment.

At block 608, the first network device receives a message that indicates congestion corresponding to the packet flow within the network switching system. For example, a component of the first network device receives an internal message that indicates another component of the first network device detected congestion corresponding to the first network device transmitting the packet flow within the network switching system, according to an embodiment. For instance, a component of the packet processor 140 (e.g., the path selection engine 172) of the LC switch 104-1 receives an internal congestion message that indicates another component of the packet processor 140 (e.g., the congestion detection engine 152) detected congestion corresponding to the LC switch 104-1 transmitting the packet flow via one of the uplink ports of the LC switch 104-1, according to an embodiment. As another example, a component of a packet processor (e.g., a path selection engine) of the fabric switch 108-1 receives an internal congestion message that indicates another component of the packet processor (e.g., a congestion detection engine) detected congestion corresponding to the fabric switch 108-1 transmitting the packet flow via one of the ports of the fabric switch 108-1, according to another embodiment.

Aa another example, the first network device receives a message that indicates a second network device within the network switching system detected congestion corresponding to the second network device transmitting the packet flow, according to an embodiment. For instance, the packet processor 140 (e.g., the path selection engine 172) of the LC switch 104-1 receives a congestion message from the LC switch 104-4 that the LC switch 104-4 detected congestion corresponding to the LC switch 104-4 transmitting the packet flow via one of the downlink ports of the LC switch 104-4, according to an embodiment. As another example, the packet processor 140 (e.g., the path selection engine 172) of the LC switch 104-1 receives a congestion message from the fabric switch 108-1 that the fabric switch 108-1 detected congestion corresponding to the fabric switch 108-1 transmitting the packet flow via one of the ports of the fabric switch 108-1, according to an embodiment. As another example, a packet processor (e.g., a path selection engine) of the fabric switch 108-1 receives a congestion message from another network device in the network switching system 100 that the other network device detected congestion corresponding to the other network device transmitting the packet flow via one of the ports of the other network device, according to an embodiment.

At block 612, in response to the message received at block 608, the first network device selects a second network interface of the first network device for transmitting one or more second packets that belong to the packet flow. In an embodiment, the method 600 further comprises selecting the first network interface from a plurality of network interfaces that correspond to respective alternative paths through the network system for the packet flow; and selecting the second network interface at block 612 comprises selecting the second network interface from the plurality of network interfaces, according to an embodiment. In an embodiment, selecting the first network interface from the plurality of network interfaces comprises pseudorandomly selecting the first network interface from the plurality of network interfaces; and selecting the second network interface from the plurality of network interfaces at block 612 comprises pseudorandomly selecting the second network interface from the plurality of network interfaces.

In an embodiment, pseudo-randomly selecting the first network interface from the plurality of network interfaces comprises: selecting a first numeric value (e.g., a first SALT), calculating a first hash value using i) header information from a first packet in the packet flow and ii) the first numeric value, and selecting the first network interface using the first hash value; and pseudo-randomly selecting the second network interface from the plurality of network interfaces comprises: in response to the message received at block 608, selecting a second numeric value (e.g., a second SALT) that is different than the first numeric constant, calculating a second hash value using i) header information from a second packet in the packet flow and ii) the second numeric value, and selecting the second network interface using the second hash value.

In another embodiment, pseudo-randomly selecting the first network interface from the plurality of network interfaces comprises: selecting a first hash function, calculating a first hash value using i) header information from a first packet in the packet flow and ii) the first hash function, and selecting the first network interface using the first hash value; and pseudo-randomly selecting the second network interface from the plurality of network interfaces comprises: in response to the message received at block 608, selecting a second hash function that is different than the first hash function, calculating a second hash value using i) header information from a second packet in the packet flow and ii) the second hash function, and selecting the second network interface using the second hash value.

At block 616, the first network device transmits one or more second packets within the network switching system via the second network interface of the first network device, the one or more second packets belonging to a packet flow. In an embodiment, transmitting the one or more first packets at block 604 occurs before the first network device selects the second network interface at block 612, and transmitting the one or more second packets at block 616 occurs after the first network device selects the second network interface at block 612.

As an example, block 616 includes the LC switch 104-1 transmitting one or more second packets within the network switching system via a second uplink port of the LC switch 104-1, in an embodiment. As another example, the fabric switch 108-1 transmits one or more second packets within the network switching system via a different port (i.e., different than the port used to transmit the one or more first packets at block 604) of the fabric switch 108-1, the one or more second packets belonging to the packet flow, in an embodiment.

In some embodiments, the method 600 further comprises the first network device adding a first tag to one or more of the first packets and transmitting the one or more of the first packets having the first tag via the first network interface; and the first network device adding a second tag to one or more of the second packets and transmitting the one or more of the second packets having the second tag via the second network interface.

In an embodiment in which selecting the first network interface includes using the first numeric value to calculate the first hash value and selecting the second network interface includes using the second numeric value to calculate the second hash value, the first tag includes the first numeric value for use by another network device among the plurality of interconnected network devices in selecting a network interface of the other network device for transmitting packets in the packet flow; and second tag includes the second numeric value for use by another network device among the plurality of interconnected network devices in selecting a network interface of the other network device for transmitting the packets in the packet flow.

In an embodiment in which selecting the first network interface includes using the first hash function to calculate the first hash value and selecting the second network interface includes using the second hash function to calculate the second hash value, the first tag includes an indication of the first hash function for use by another network device among the plurality of interconnected network devices in selecting a network interface of the other network device for transmitting packets in the packet flow; and second tag includes an indication of the second hash function for use by another network device among the plurality of interconnected network devices in selecting a network interface of the other network device for transmitting the packets in the packet flow.

Figure 7:
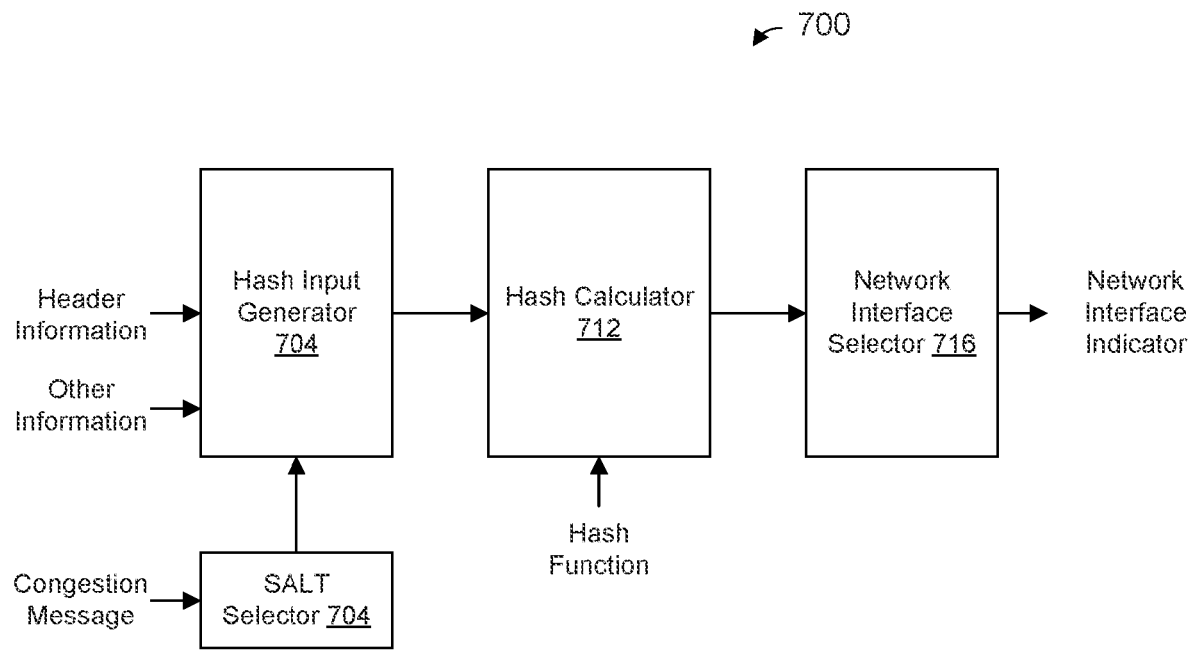
FIG. 7 is a simplified block diagram of an example of path selection circuitry that is configured to pseudorandomly select network interfaces from among a plurality of network interfaces of a network device for transmitting packets in a packet flow, according to an embodiment.

FIG. 7 is a simplified block diagram of example path selection circuitry 700 that is configured to pseudorandomly select network interfaces from among a plurality of network interfaces of a network device for transmitting packets in a packet flow, according to an embodiment. The path selection circuitry 700 is included in the path selection circuitry 172 of FIG. 1, in an embodiment. The path selection circuitry 700 is included in path selection circuitry of the fabric switch 108, in another embodiment. In other embodiments, the path selection circuitry 700 is included in another suitable network device different than the LC switch 104 and the fabric switch 108 and/or used in another suitable network switching system different than the network switching system 100. In some embodiments, the path selection circuitry 172 of FIG. 1 includes other suitable circuitry different than the path selection circuitry 700 of FIG. 7.

The path selection circuitry 700 includes first circuitry (referred to as SALT selection circuitry) 704 that is configured to select numeric values (e.g., SALT values) from a set of available numeric values. In an embodiment, the SALT selection circuitry 704 generally selects an initial SALT value (e.g., pseudorandomly, successively selecting SALT values from an ordered list of SALT values, etc.) and outputs the initial SALT value until an event occurs that prompts the SALT selection circuitry 704 to select a new SALT value (e.g., pseudorandomly, successively selecting SALT values from an ordered list of SALT values, etc.), such as in response to a congestion message.

The path selection circuitry 700 also includes second circuitry (referred to as hash input generation circuitry) 708 that is configured to generate an input for calculating a hash value by selecting i) one or more header fields of a packet, ii) optionally other information associated with the packet (such as information from a tag attached to the packet, metadata associated with the packet, etc.), and iii) the SALT value output by the SALT selection circuitry 704.

The path selection circuitry 700 also includes hash calculation circuitry 712 that is configured to, for each of at least some packets in a packet flow, calculate a respective hash value by applying a hash function to the output of the hash input generation circuitry 708.

The path selection circuitry 700 also includes third circuitry (referred to as network interface selection circuitry) 716 that is configured to, for each of at least some packets in the packet flow, select a network interface for transmitting the packet using the hash value calculated by the hash calculation circuitry 712.

In some embodiments, the path selection circuitry 700 is configured to selectively use a SALT value received from another network device in the network switching system, such as a SALT value received in a tag attached to a packet.

In some embodiments, the path selection circuitry 700 omits the SALT selection circuitry 704 and is configured to use a SALT value received from another network device in the network switching system, such as a SALT value received in a tag attached to a packet.

Figure 8:
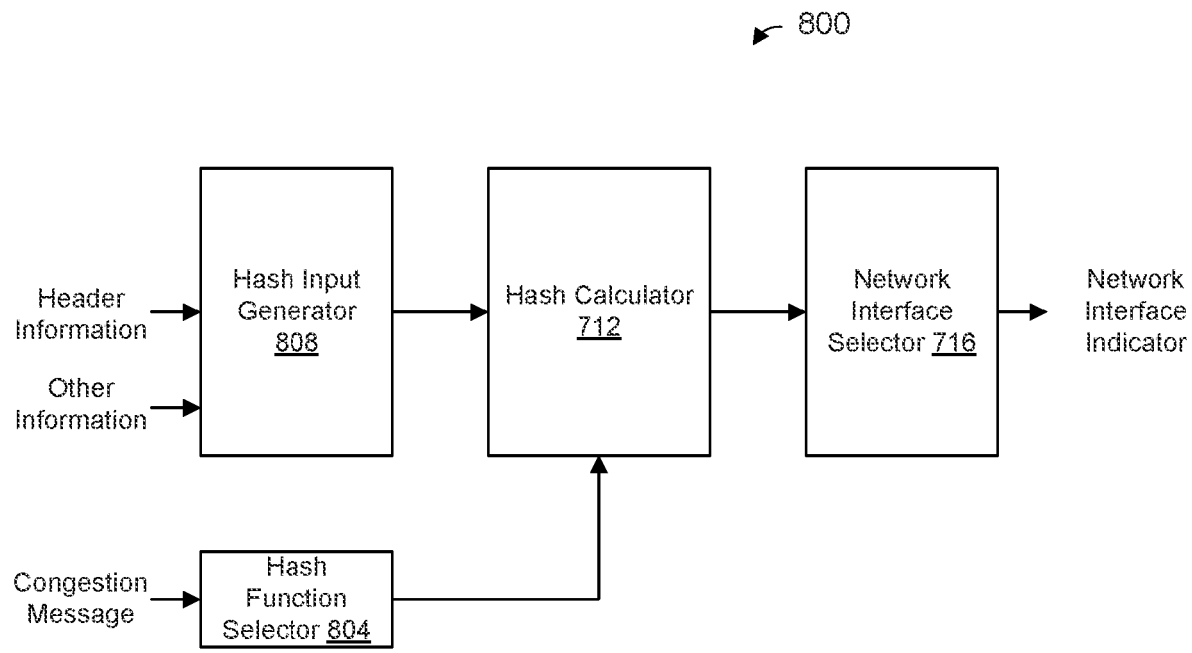
FIG. 8 is a simplified block diagram of another example of path selection circuitry that is configured to pseudo-randomly select network interfaces from among a plurality of network interfaces of a network device for transmitting packets in a packet flow, according to another embodiment.

FIG. 8 is a simplified block diagram of another example path selection circuitry 800 that is configured to pseudorandomly select network interfaces from among a plurality of network interfaces of a network device for transmitting packets in a packet flow, according to another embodiment. The path selection circuitry 800 is included in the path selection circuitry 172 of FIG. 1, in an embodiment. The path selection circuitry 800 is included in path selection circuitry of the fabric switch 108, in another embodiment. In other embodiments, the path selection circuitry 800 is included in another suitable network device different than the LC switch 104 and the fabric switch 108 and/or used in another suitable network switching system different than the network switching system 100. In some embodiments, the path selection circuitry 172 of FIG. 1 includes other suitable circuitry different than the path selection circuitry 800 of FIG. 7.

The path selection circuitry 800 is similar to the path selection circuitry 700 of FIG. 7, and like-numbered elements are not described again in detail for purposes of brevity.

The path selection circuitry 700 includes first circuitry (referred to as hash function selection circuitry) 804 that is configured to select a hash function from a set of available hash functions. In an embodiment, the hash function selection circuitry 804 generally selects an initial hash function (e.g., pseudorandomly, successively selecting hash functions from an ordered list of hash functions, etc.) and outputs an indication of the initial hash function until an event occurs that prompts the hash function selection circuitry 804 to select a new hash function (e.g., pseudorandomly, successively selecting hash functions from an ordered list of hash functions, etc.), such as in response to a congestion message.

The path selection circuitry 800 also includes second circuitry (referred to as hash input generation circuitry) 808 that is configured to generate an input for calculating a hash value by selecting i) one or more header fields of a packet, and ii) optionally other information associated with the packet (such as information from a tag attached to the packet, metadata associated with the packet, etc.).

The path selection circuitry 800 also includes the hash calculation circuitry 712 that is configured to, for each of at least some packets in a packet flow, calculate a respective hash value by applying a hash function, selected by the hash function selection circuitry 804, to the output of the hash input generation circuitry 808.

In some embodiments, the path selection circuitry 800 is configured to selectively use an indication of a hash function received from another network device in the network switching system, such as an indication of a hash function received in a tag attached to a packet. In some embodiments, the path selection circuitry 800 omits the hash function selection circuitry 804 and is configured to use an indication of a hash function received from another network device in the network switching system, such as an indication of a hash function received in a tag attached to a packet.

Embodiment 1: A first network switching device for use in a network switching system that comprises a plurality of interconnected network switching devices, the first network switching device comprising: a plurality of first network interfaces configured to communicatively couple to a plurality of network uplinks that are communicatively coupled to multiple other network switching devices in the network switching system; a plurality of second network interfaces configured to communicatively couple to a plurality of network downlinks that are communicatively coupled to one or more network devices external to the network switching system; a packet processor configured to process packets received by the plurality of first network interfaces and the plurality of second network interfaces and to forward packets to the plurality of first network interfaces and the plurality of second network interfaces for transmission. The packet processor includes circuitry configured to: forward first packets belonging to a packet flow to one of the first network interfaces for transmission within the network switching system; receive a message that indicates congestion corresponding to the packet flow within the network switching system; in response to the message, select another first network interface for forwarding one or more second packets that belong to the packet flow; and after receiving the message, forwarding the one or more second packets to the other first network interface.

Embodiment 2: The first network switching device of embodiment 1, wherein the packet processor includes: congestion detection circuitry that is configured to generate the message to indicate that the first network device is experiencing congestion in connection with the first network device transmitting the packet flow via the one first network interface.

Embodiment 3: The first network switching device of embodiment 1, wherein the packet processor is configured to: receive the message from a second network device among the plurality of interconnected network devices, the message indicating that the second network device is experiencing congestion in connection with the second network device transmitting the packet flow within the network switching system.

Embodiment 4: The first network switching device of either of embodiments 2 or 3, wherein: the message includes an indicator of the packet flow; and the packet processor is further configured to use the indicator of the packet flow to determine that the network device is to select another first network interface that is different than the one first network interface for transmitting the one or more second packets that belong to the packet flow.

Embodiment 5: The first network switching device of any of embodiments 1-4, wherein the packet processor includes path selection circuitry configured to: pseudorandomly select the other first network interface from among the plurality of first network interfaces.

Embodiment 6: The first network switching device of embodiment 5, wherein the path selection circuitry comprises: first circuitry configured to select numeric values from a set of available numeric values, including selecting a first numeric value for the first packets in the packet flow and, in response to the message, selecting a second numeric value for the second packets in the packet flow; hash calculation circuitry configured to, for each of at least some packets in the packet flow, calculate a respective hash value using the numeric value selected by the first circuitry; and second circuitry configured to, for each of at least some packets in the packet flow, select a first network interface for transmitting the packet using the hash value.

Embodiment 7: The first network switching device of embodiment 6, wherein the packet processor is further configured to: for each of the one or more first packets, add a first tag to the first packet prior to transmitting the first packet via the one first network interface, the first tag including the first numeric value for use by another network device among the plurality of interconnected network devices in selecting a network interface of the other network device for transmitting the first packet; and for each of the one or more second packets, adding a second tag to the second packet prior to transmitting the third packet via the other first network interface, the second tag including the second numeric value for use by another network device among the plurality of interconnected network devices in selecting a network interface of the other network device for transmitting the third packet.

Embodiment 8: The first network switching device of embodiment 6, wherein the hash calculation circuitry is further configured to, for each of at least some packets in the packet flow: calculate the respective hash value further using header information from the packet.

Embodiment 9: The first network switching device of embodiment 5, wherein the path selection circuitry comprises: first circuitry configured to select hash functions from a set of available hash functions, including selecting a first hash function for the first packets in the packet flow and, in response to the message, selecting a second hash function for the second packets in the packet flow; hash calculation circuitry configured to, for each of at least some packets in the packet flow, calculate a respective hash value by applying the hash function selected by the first circuitry to header information from the packet; and second circuitry configured to, for each of at least some packets in the packet flow, select a first network interface for transmitting the packet using the hash value.

Embodiment 10: The first network switching device of embodiment 9, wherein the packet processor is further configured to: for each of the one or more first packets, add a first tag to the first packet prior to transmitting the first packet via the one first network interface, the first tag including an indication of the first hash function for use by another network device among the plurality of interconnected network devices in selecting a network interface of the other network device for transmitting the first packet; and for each of the one or more second packets, adding a second tag to the second packet prior to transmitting the second packet via the other first network interface, the second tag including an indication of the second hash function for use by another network device among the plurality of interconnected network devices in selecting a network interface of the other network device for transmitting the third packet.

Embodiment 11: A method of load balancing in a network switching system that comprises a plurality of interconnected network devices, the method comprising: transmitting, by a first network device among the plurality of interconnected network devices, one or more first packets via a first network interface of the first network device, the one or more first packets belonging to a packet flow; receiving, at the first network device, a message that indicates congestion corresponding to the packet flow within the network switching system; in response to the message, selecting, at the first network device, a second network interface of the first network device for transmitting one or more second packets that belong to the packet flow; and after receiving the message, transmitting, by the first network device, the one or more second packets via the second network interface of the first network device.

Embodiment 12: The method of load balancing of embodiment 11, wherein receiving the message that indicated congestion comprises: receiving an internal message within the first network device that indicates the first network device is experiencing congestion in connection with the first network device transmitting the packet flow within the network switching system.

Embodiment 13: The method of load balancing of embodiment 11, wherein receiving the message that indicated congestion comprises: receiving, at the first network device, the message from a second network device among the plurality of interconnected network devices, the message indicating that the second network device is experiencing congestion in connection with the second network device transmitting the packet flow within the network switching system.

Embodiment 14: The method of load balancing of embodiment 13, wherein: receiving the message comprises receiving a message that includes an indicator of the packet flow; and the method further comprises using the indicator of the packet flow to determine that the network device is to select a network interface of the first network device that is different than the first network interface for transmitting the one or more second packets that belong to the packet flow.

Embodiment 15: The method of load balancing of any of embodiments 11-14, wherein selecting the second network interface for transmitting the one or more second packets comprises: pseudorandomly selecting the second network interface from among a plurality of network interfaces of the first network device that correspond to respective alternative paths through the network system for the packet flow.

Embodiment 16: The method of load balancing of embodiment 15, further comprising: pseudo-randomly selecting, at the first network device, the first network interface for transmitting the one or more first packets that belong to the packet flow, including: selecting a first numeric value, and for each of the one or more first packets: calculating a first hash value the first numeric value, and selecting the first network interface for transmitting the first packet using the first hash value. Pseudo-randomly selecting the second network interface for transmitting the one or more second packets comprises: in response to the message, selecting a second numeric value that is different than the first numeric value, and for each of the one or more second packets: calculating a second hash value using the second numeric value, and selecting the second network interface for transmitting the second packet using the second hash value.

Embodiment 17: The method of load balancing of embodiment 16, further comprising: for each of the one or more first packets, adding a first tag to the first packet prior to transmitting the first packet via the first network interface, the first tag including the first numeric value for use by another network device among the plurality of interconnected network devices in selecting a network interface of the other network device for transmitting the first packet; and for each of the one or more second packets, adding a second tag to the second packet prior to transmitting the second packet via the second network interface, the second tag including the second numeric value for use by another network device among the plurality of interconnected network devices in selecting a network interface of the other network device for transmitting the third packet.

Embodiment 18: The method of load balancing of embodiment 16, wherein: calculating the first hash value comprises calculating the first hash value further using header information from the first packet; and calculating the second hash value comprises calculating the second hash value further using header information from the second packet.

Embodiment 19: The method of load balancing of embodiment 15, further comprising: pseudo-randomly selecting, at the first network device, the first network interface for transmitting the one or more first packets that belong to the packet flow, including: selecting a first hash function, and for each of the one or more first packets: calculating a first hash value by applying the first hash function to header information from the first packet, and selecting the first network interface for transmitting the first packet using the first hash value. Pseudo-randomly selecting the second network interface for transmitting the one or more second packets comprises: in response to the message, selecting a second hash function that is different than the first hash function, and for each of the one or more second packets: calculating a second hash value by applying the second hash function to header information from the second packet, and selecting the second network interface for transmitting the second packet using the second hash value.

Embodiment 20: The method of load balancing of embodiment 19, further comprising: for each of the one or more first packets, adding a first tag to the first packet prior to transmitting the first packet via the first network interface, the first tag including an indication of the first hash function for use by another network device among the plurality of interconnected network devices in selecting a network interface of the other network device for transmitting the first packet; and for each of the one or more second packets, adding a second tag to the second packet prior to transmitting the second packet via the second network interface, the second tag including an indication of the second hash function for use by another network device among the plurality of interconnected network devices in selecting a network interface of the other network device for transmitting the third packet.

At least some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in any suitable computer readable memory. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A first network switching device for use in a network switching system that comprises a plurality of interconnected network switching devices, the first network switching device comprising:
 a plurality of first network interfaces configured to communicatively couple to a plurality of network uplinks that are communicatively coupled to multiple other network switching devices in the network switching system;
 a plurality of second network interfaces configured to communicatively couple to a plurality of network downlinks that are communicatively coupled to one or more network devices external to the network switching system; and a packet processor configured to process packets received by the plurality of first network interfaces and the plurality of second network interfaces and to forward packets to the plurality of first network interfaces and the plurality of second network interfaces for transmission, the packet processor including circuitry configured to:

forward first packets belonging to a packet flow to one of the first network interfaces for transmission via a first path through the network switching system from the one first network interface to an endpoint of the network switching system, receive a message that indicates congestion corresponding to the packet flow transmitted via the first path through the network switching system, in response to the message that indicates congestion corresponding to the packet flow transmitted via the first path through the network switching system, select another first network interface for forwarding one or more second packets that belong to the packet flow regardless of a congestion level corresponding to a second path through the network switching system from the other first network interface to the endpoint, and after receiving the message, forwarding the one or more second packets to the other first network interface.

2. The first network switching device of claim 1, wherein the packet processor includes:

congestion detection circuitry that is configured to generate the message to indicate that the first network device is experiencing congestion in connection with the first network switching device transmitting the packet flow via the one first network interface.

3. The first network switching device of claim 1, wherein the packet processor is configured to:

receive the message from a second network device among the plurality of interconnected network switching devices, the second network device in the first path between the first network switching device and the endpoint, the message having been generated by the second network device to indicate that the second network device is experiencing congestion in connection with the second network device transmitting the packet flow within the network switching system.

4. The first network switching device of claim 3, wherein:
the message includes an indicator of the packet flow; and
the packet processor is further configured to use the indicator of the packet flow to determine that the first network switching device is to select another first network interface that is different than the one first network interface for transmitting the one or more second packets that belong to the packet flow.

5. The first network switching device of claim 1, wherein the packet processor includes path selection circuitry configured to:

pseudorandomly select the other first network interface from among the plurality of first network interfaces regardless of the congestion level corresponding to the second path from the other first network interface to the endpoint.

6. The first network switching device of claim 5, wherein the path selection circuitry comprises:

first circuitry configured to select numeric values from a set of available numeric values, including selecting a first numeric value for the first packets in the packet flow and, in response to the message, selecting a second numeric value for the second packets in the packet flow;

hash calculation circuitry configured to, for each of at least some packets in the packet flow, calculate a respective hash value using the numeric value selected by the first circuitry; and second circuitry configured to, for each of at least some packets in the packet flow, select a first network interface for transmitting the packet using the hash value.

7. The first network switching device of claim 6, wherein the packet processor is further configured to:

for each of the one or more first packets, add a first tag to the first packet prior to transmitting the first packet via the one first network interface, the first tag including the first numeric value for use by another network device among the plurality of interconnected network switching devices in selecting a network interface of the other network device for transmitting the first packet; and for each of the one or more second packets, adding a second tag to the second packet prior to transmitting a third packet via the other first network interface, the second tag including the second numeric value for use by another network device among the plurality of interconnected network switching devices in selecting a network interface of the other network device for transmitting the third packet.

8. The first network switching device of claim 6, wherein the hash calculation circuitry is further configured to, for each of at least some packets in the packet flow:

calculate the respective hash value further using header information from the packet.

9. The first network switching device of claim 5, wherein the path selection circuitry comprises:

first circuitry configured to select hash functions from a set of available hash functions, including selecting a first hash function for the first packets in the packet flow and, in response to the message, selecting a second hash function for the second packets in the packet flow;

hash calculation circuitry configured to, for each of at least some packets in the packet flow, calculate a respective hash value by applying the hash function selected by the first circuitry to header information from the packet; and second circuitry configured to, for each of at least some packets in the packet flow, select a first network interface for transmitting the packet using the hash value.

10. The first network switching device of claim 9, wherein the packet processor is further configured to:

for each of the one or more first packets, add a first tag to the first packet prior to transmitting the first packet via the one first network interface, the first tag including an indication of the first hash function for use by another network device among the plurality of interconnected network switching devices in selecting a network interface of the other network device for transmitting the first packet; and for each of the one or more second packets, adding a second tag to the second packet prior to transmitting the second packet via the other first network interface, the second tag including an indication of the second hash function for use by another network device among the plurality of interconnected network switching devices in selecting a network interface of the other network device for transmitting a third packet.

11. A method of load balancing in a network switching system that comprises a plurality of interconnected network devices, the method comprising:
- transmitting, by a first network device among the plurality of interconnected network devices, one or more first packets from a first network interface of the first network device, the first network interface coupled to a first path through the network switching system to an endpoint of the network switching system, the one or more first packets belonging to a packet flow;
- receiving, at the first network device, a message that indicates congestion corresponding to the packet flow transmitted via the first path through the network switching system;
- in response to the message that indicates congestion corresponding to the packet flow transmitted via the first path through the network switching system, selecting, at the first network device, a second network interface of the first network device for transmitting one or more second packets that belong to the packet flow, including selecting the second network interface regardless of a congestion level corresponding to a second path through the network switching system from the second network interface to the endpoint; and
- after receiving the message, transmitting, by the first network device, the one or more second packets via the second network interface of the first network device.

12. The method of load balancing of claim 11, wherein receiving the message that indicated congestion comprises:
- receiving an internal message within the first network device that indicates the first network device is experiencing congestion in connection with the first network device transmitting the packet flow within the network switching system.

13. The method of load balancing of claim 11, wherein receiving the message that indicated congestion comprises:
- receiving, at the first network device, the message from a second network device among the plurality of interconnected network devices, the second network device in the first path between the first network switching device and the endpoint, the message having been generated by the second network device to indicate that the second network device is experiencing congestion in connection with the second network device transmitting the packet flow within the network switching system.

14. The method of load balancing of claim 13, wherein:
- receiving the message comprises receiving a message that includes an indicator of the packet flow; and
- the method further comprises using the indicator of the packet flow to determine that the first network switching device is to select a network interface of the first network device that is different than the first network interface for transmitting the one or more second packets that belong to the packet flow.

15. The method of load balancing of claim 11, wherein selecting the second network interface for transmitting the one or more second packets comprises:
- pseudorandomly selecting the second network interface from among a plurality of network interfaces of the first network device that correspond to respective alternative paths through the network switching system for the packet flow, including pseudorandomly selecting the second network interface regardless of the congestion level corresponding to the second path from the second network interface to the endpoint.

16. The method of load balancing of claim 15, further comprising:
- pseudo-randomly selecting, at the first network device, the first network interface for transmitting the one or more first packets that belong to the packet flow, including:
  - selecting a first numeric value, and
  - for each of the one or more first packets:
    - calculating a first hash value using the first numeric value, and
    - selecting the first network interface for transmitting the first packet using the first hash value;
- wherein pseudo-randomly selecting the second network interface for transmitting the one or more second packets comprises:
  - in response to the message, selecting a second numeric value that is different than the first numeric value, and
  - for each of the one or more second packets:
    - calculating a second hash value using the second numeric value, and
    - selecting the second network interface for transmitting the second packet using the second hash value.

17. The method of load balancing of claim 16, further comprising:
- for each of the one or more first packets, adding a first tag to the first packet prior to transmitting the first packet via the first network interface, the first tag including the first numeric value for use by another network device among the plurality of interconnected network devices in selecting a network interface of the other network device for transmitting the first packet; and
- for each of the one or more second packets, adding a second tag to the second packet prior to transmitting the second packet via the second network interface, the second tag including the second numeric value for use by another network device among the plurality of interconnected network devices in selecting a network interface of the other network device for transmitting a third packet.

18. The method of load balancing of claim 16, wherein:
- calculating the first hash value comprises calculating the first hash value further using header information from the first packet; and
- calculating the second hash value comprises calculating the second hash value further using header information from the second packet.

19. The method of load balancing of claim 15, further comprising:
- pseudo-randomly selecting, at the first network device, the first network interface for transmitting the one or more first packets that belong to the packet flow, including:
  - selecting a first hash function, and
  - for each of the one or more first packets:
    - calculating a first hash value by applying the first hash function to header information from the first packet, and
    - selecting the first network interface for transmitting the first packet using the first hash value;
- wherein pseudo-randomly selecting the second network interface for transmitting the one or more second packets comprises:
  - in response to the message, selecting a second hash function that is different than the first hash function, and for each of the one or more second packets:
  calculating a second hash value by applying the second hash function to header information from the second packet, and
  selecting the second network interface for transmitting the second packet using the second hash value.

20. The method of load balancing of claim 19, further comprising:
for each of the one or more first packets, adding a first tag to the first packet prior to transmitting the first packet via the first network interface, the first tag including an indication of the first hash function for use by another network device among the plurality of interconnected network devices in selecting a network interface of the other network device for transmitting the first packet; and
for each of the one or more second packets, adding a second tag to the second packet prior to transmitting the second packet via the second network interface, the second tag including an indication of the second hash function for use by another network device among the plurality of interconnected network devices in selecting a network interface of the other network device for transmitting a third packet.

* * * * *